(12) United States Patent
Mahiko et al.

(10) Patent No.: US 12,351,463 B2
(45) Date of Patent: Jul. 8, 2025

(54) HETEROATOM-DOPED NANODIAMOND

(71) Applicant: DAICEL CORPORATION, Osaka (JP)

(72) Inventors: Tomoaki Mahiko, Tokyo (JP); Yuto Makino, Tokyo (JP); Akihiko Tsurui, Tokyo (JP); Ming Liu, Tokyo (JP); Masahiro Nishikawa, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 926 days.

(21) Appl. No.: 17/598,001

(22) PCT Filed: Mar. 16, 2020

(86) PCT No.: PCT/JP2020/011336
§ 371 (c)(1),
(2) Date: Sep. 24, 2021

(87) PCT Pub. No.: WO2020/195997
PCT Pub. Date: Oct. 1, 2020

(65) Prior Publication Data
US 2022/0185676 A1    Jun. 16, 2022

(30) Foreign Application Priority Data

Mar. 26, 2019  (JP) .................. 2019-058397
Nov. 26, 2019  (JP) .................. 2019-213628

(51) Int. Cl.
*C01B 32/26* (2017.01)
*C09K 11/59* (2006.01)
(Continued)

(52) U.S. Cl.
CPC .............. *C01B 32/26* (2017.08); *C09K 11/59* (2013.01); *C09K 11/63* (2013.01); *C09K 11/70* (2013.01);
(Continued)

(58) Field of Classification Search
CPC ......... C01B 32/26; C01B 32/15; C09K 11/59; C09K 11/63; C09K 11/70; C09K 11/65;
(Continued)

(56) References Cited

U.S. PATENT DOCUMENTS

2003/0228249 A1* 12/2003 Fujimura ............... C25D 15/02
                                                              423/446
2005/0158549 A1   7/2005 Khabashesku et al.
(Continued)

FOREIGN PATENT DOCUMENTS

CN       1411902 A    4/2003
CN     104060237 A    9/2014
(Continued)

OTHER PUBLICATIONS

Zou, et al., Characterizaiton of structures and surface states of the nanodiamond synthesized by detonation, Materials Characterization 2009; 60: 1257-1262 (Year: 2009).*
(Continued)

*Primary Examiner* — Daniel C. McCracken
(74) *Attorney, Agent, or Firm* — Birch, Stewart, Kolasch & Birch, LLP

(57) ABSTRACT

The present invention is to provide a heteroatom-doped nanodiamond, the heteroatom-doped nanodiamond being doped with at least one heteroatom, the heteroatom-doped nanodiamond satisfying criteria (i) and/or (ii) below: (i) a BET specific surface area being from 20 to 900 m²/g, and (ii) an average size of primary particles being from 2 to 70 nm.

12 Claims, 1 Drawing Sheet

(51) Int. Cl.
    *C09K 11/63* (2006.01)
    *C09K 11/70* (2006.01)
(52) U.S. Cl.
    CPC ...... *C01P 2002/72* (2013.01); *C01P 2002/82* (2013.01); *C01P 2004/30* (2013.01); *C01P 2004/64* (2013.01); *C01P 2006/12* (2013.01); *C01P 2006/90* (2013.01)
(58) Field of Classification Search
    CPC .. C09K 11/66; C01P 2002/72; C01P 2002/82; C01P 2004/30; C01P 2004/64; C01P 2006/12; C01P 2006/90; C01P 2002/52; H01B 1/06; H01B 1/10; B82Y 30/00; B82Y 20/00; B82Y 40/00; B01J 3/08
    See application file for complete search history.

(56) References Cited

U.S. PATENT DOCUMENTS

| | | | |
|---|---|---|---|
| 2009/0220556 | A1 | 9/2009 | Shenderova et al. |
| 2010/0181534 | A1 | 7/2010 | Shenderova et al. |
| 2010/0254884 | A1 | 10/2010 | Shenderova |
| 2015/0157997 | A1 | 6/2015 | Spitzer et al. |
| 2015/0276754 | A1 | 10/2015 | Shirakawa et al. |
| 2021/0395607 | A1 | 12/2021 | Nakao et al. |

FOREIGN PATENT DOCUMENTS

| | | | | |
|---|---|---|---|---|
| CN | 104870365 | A | 8/2015 | |
| CN | 108190859 | A | 6/2018 | |
| DE | 19933648 | A1 * | 1/2018 | ............ C01B 31/06 |
| JP | 2004-176132 | A | 6/2004 | |
| JP | 2014-504254 | A | 2/2014 | |
| JP | 2016-117852 | A | 6/2016 | |
| JP | 2020-76084 | A | 5/2020 | |
| WO | WO 2012/084656 | A1 | 6/2012 | |
| WO | WO 2013/127967 | A1 | 9/2013 | |

OTHER PUBLICATIONS

Ekimov, et al., Effect of Si, Ge and Sn dopant elements on structure and photoluminescence of nano- and microdiamonds synthesized from organic compounds, Diamond & Related Materials 2019; 93: 75-83 (published online Jan. 31, 2019) (Year: 2019).*

Tchernij, et al., Single-Photon Emitters in Lead-Implated Single-Crystal Diamond, ACS Photonics 2018; 5: 4864-4871 (Year: 2018).*

Bogdanov et al., "Size-dependent Raman and SiV-center luminescence in polycrystalline nanodiamonds produced by shock wave synthesis," RSC Advances, vol. 6, 2016, pp. 51783-51790.

Bolshedvorskii et al., "Single SiV centers in ultranano-sized diamonds," arXiv [Online], 2018, 1812.06534v1, <URL: https://arxiv.org/abs/1812.06534v1>.

Catledge et al., "Strong Narrow-Band Luminescence from Silicon-Vacancy Color Centers in Spatially Localized Sub-10 nm Nanodiamond," Advanced Science Letters, vol. 4, No. 2, 2011, pp. 512-515.

Iwasaki et al., "Germanium-Vacancy Single Color Centers in Diamond," Scientific Reports, vol. 5, No. 12882, 2015, pp. 1-7.

Schröder et al., "Quantum nanophotonics in diamond [Invited]," Journal of the Optical Society of America B, vol. 33, No. 4, 2016, pp. 665-683.

Sipahigil et al., "An integrated diamond nanophotonics platform for quantum-optical networks," Science, vol. 354, No. 6314, 2016, pp. 847-850.

Wang et al., "Single photon emission from SiV centres in diamond produced by ion implantation," Journal of Physics B: Atomic, Molecular and Optical Physics, vol. 39, 2005, pp. 37-41.

Catledge et al., "Strong Narrow-Band Luminescence from Silicon-Vacancy Color Centers in Spatially Localized Sub-10 nm Nanodiamond," Advanced Science Letters, vol. 4, 2011, pp. 512-515, 4 pages total.

Ekimov et al., "Effect of Si, Ge and Sn dopant elements on structure and photoluminescence of nano- and microdiamonds synthesized from organic compounds," Diamond & Related Materials, vol. 93, 2019, pp. 75-83, 9 pages total.

International Preliminary Report on Patentability and English translation of the Written Opinion of the International Searching Authority for International Application No. PCT/JP2020/011336, dated Oct. 7, 2021.

International Search Report for International Application No. PCT/JP2020/011336, dated Jun. 9, 2020, with an English translation.

Neu et al., "Narrowband fluorescent nanodiamonds produced from chemical vapor deposition films," Applied Physics Letters, vol. 98, 2011, 4 pages total.

Tegetmeyer et al., "Incorporation of SiV-centers in diamond nanoparticles using silicon background doping," Diamond & Related Materials, vol. 65, 2016, pp. 87-90, 4 pages total.

Vlasov et al., "Molecular-sized fluorescent nanodiamonds," Nature Nanotechnology, vol. 9, 2014, pp. 54-58, 5 pages total.

Choi et al., "Varying Temperature and Silicon Content in Nanodiamond Growth: Effects on Silicon-Vacancy Centres", Scientific Reports, vol. 8, 2018, (published online Feb. 28, 2018), pp. 1-7.

Bogdanov et al., "Desorption of Impurities During Heating of Detonation Nanodiamond", Technical Physics Letters, vol. 38, No. 4, 2012., pp. 89-95, with an English translation.

Mochalin et al., "The Properties and Applications of Nanodiamonds", Nature Nanotechnology, vol. 7, Jan. 2012 (published online Dec. 18, 2011), pp. 11-23.

Plotnikov et al., "The Structure of Detonation Nanodiamond Particles", AIP Conference Proceedings, vol. 1785. Nov. 18, 2016, pp. 040045 (5 pages total).

Tchernij et al., "Single-Photon Emitters in Lead-Implanted Single-Crystal Diamond", ACS Photonics, vol. 5, 2018, pp. 4864-4871.

Bradac et al., "Observation and control of blinking nitrogen-vacancy centres in discrete nanodiamonds," Nature Nanotechnology, vol. 5, 2010, pp. 345-349, 5 pages total.

Duffy et al., "Assessing the extent, stability, purity and properties of silanised detonation nanodiamond," Applied Surface Science, vol. 357, 2015, pp. 397-406, 10 pages total.

Ekimov et al., "High-Pressure Synthesis of Boron-Doped Ultrasmall Diamonds from an Organic Compound," Advanced Materials, vol. 27, 2015, pp. 5518-5522, 5 pages total.

Iwasaki et al., "Tin-Vacancy Quantum Emitters in Diamond," Physical Review Letters, 2017, 6 pages total.

Krueger, "New Carbon Materials: Biological Applications of Functionalized Nanodiamond Materials," Chemistry—A European Journal, vol. 14, 2008, pp. 1382-1390, 9 pages total.

Mochalin et al., "The properties and applications of nanodiamonds," Nature Nanotechnology, 2011, pp. 1-13, 13 pages total.

\* cited by examiner (a)
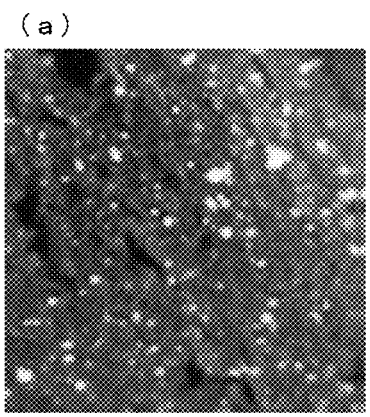
(b)
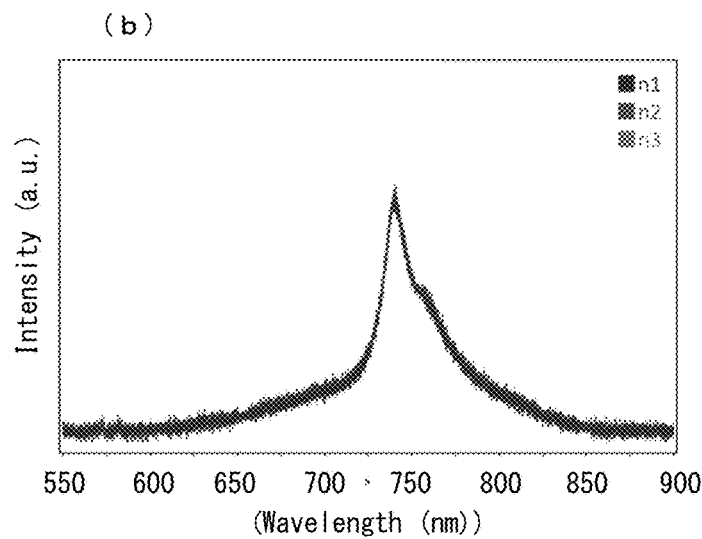
(c)
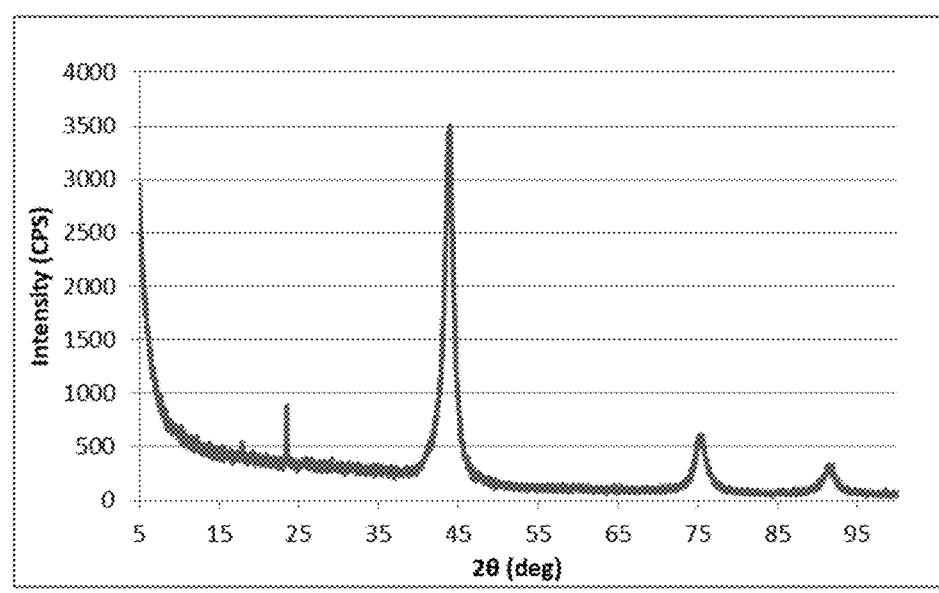

HETEROATOM-DOPED NANODIAMOND

TECHNICAL FIELD

The present invention relates to heteroatom-doped nanodiamonds.

BACKGROUND ART

A luminescent center in diamond is a nanosized chemically stable fluorescent chromophore and does not exhibit degradation, fading, or flickering in vivo, which often occur in organic fluorescent, and thus is expected as probes for fluorescence imaging. In addition, information on spins of electrons excited in the luminescent center can be sometimes measured from outside, and thus the luminescent center is also expected to be utilized in optically detected magnetic resonance (ODMR) or as a quantum bit.

The Si-V center, which is a type of luminescent center of diamond, has a sharp peak called zero phonon level (ZPL) in an emission spectrum (Non-Patent Literature 1).

Diamonds doped with silicon are produced by CVD, for example (Patent Documents 1 and 2).

In Non-Patent Literature 2, nanodiamonds in a meteorite are analyzed; however, nanodiamonds having the silicon-vacancy (SiV) center are not produced. Non-Patent Literature 2 describes that the Si-V center in nanodiamond of 1.1 nm to 1.8 nm is thermodynamically stable according to simulation.

FIG. 1 of Non-Patent Literature 3 shows nanodiamonds having the Si-V center adjusted by CVD according AFM. In a graph at the upper right part of FIG. 1, the vertical axis represents the height (nm) and the horizontal axis represents the position (μ), and it is clear that the peak height thereof is approximately 9 nm, and the width (position) is at least 70 nm.

Non-Patent Literature 4 describes, by using nanodiamonds of 3 to 4 nm as a seed solution and allowing growth on a silicon wafer by MWPE-CVD, nanodiamonds having an average particle diameter of 73 nm and having the SiV center can be obtained.

CITATION LIST

Patent Document

Patent Document 1: JP 2014-504254 T
Patent Document 2: JP 2004-176132 A

Non-Patent Literature

Non-Patent Literature 1: E. Neu et al. APPLIED PHYSICS LETTERS 98, 243107 (2011)
Non-Patent Literature 2: Nat Nanotechnol. 2014 January; 9(1): 54-8. doi: 10.1038/nnano.2013.255. Epub 2013 Dec. 8.
Non-Patent Literature 3: Adv Sci Lett. 2011 Feb. 1; 4(2): 512-515.
Non-Patent Literature 4: Diamond and Related Materials, Volume 65, 2016, Pages 87-90

SUMMARY OF INVENTION

Technical Problem

An object of the present invention is to provide a novel nanodiamond doped with a heteroatom.

Solution to Problem

The present invention is to provide the following heteroatom-doped nanodiamonds.

Item 1. A heteroatom-doped nanodiamond,
the heteroatom-doped nanodiamond being doped with at least one heteroatom,
the heteroatom-doped nanodiamond satisfying requirement (i) and/or (ii) below:
(i) a BET specific surface area being from 20 to 900 $m^2/g$, and
(ii) an average size of primary particles being from 2 to 70 nm.

Item 2. The heteroatom-doped nanodiamond according to Item 1, where the heteroatom comprises at least one selected from the group consisting of Group 14 elements, phosphorus, and boron.

Item 3. The heteroatom-doped nanodiamond according to Item 1 or 2, where the heteroatom-doped nanodiamond has a fluorescence emission peak.

Item 4. The heteroatom-doped nanodiamond according to any one of Items 1 to 3, where the fluorescence emission peak is originated from at least one heteroatom-vacancy center.

Item 5. The heteroatom-doped nanodiamond according to any one of Items 1 to 4, where the heteroatom-doped nanodiamond emitting fluorescence is further doped with phosphorus and/or boron.

Item 6. The heteroatom-doped nanodiamond according to any one of Items 1 to 5, where the heteroatom-doped nanodiamond has a fluorescence emission peak at from 720 to 770 nm, and the heteroatom contains silicon.

Item 7. The heteroatom-doped nanodiamond according to any one of Items 1 to 5, where the heteroatom-doped nanodiamond has a fluorescence emission peak at from 580 to 630 nm, and the heteroatom comprises germanium.

Item 8. The heteroatom-doped nanodiamond according to any one of Items 1 to 5, where the heteroatom-doped nanodiamond has a fluorescence emission peak at from 590 to 650 nm, and the heteroatom comprises tin.

Item 9. The nanodiamond according to any one of Items 1 to 5, where the nanodiamond has a fluorescence emission peak at from 540 to 600 nm, and the heteroatom comprises lead.

Item 10. The heteroatom-doped nanodiamond according to any one of Items 1 to 9, which produces fluorescence due to a nitrogen-vacancy (N-V) center.

Item 11. The heteroatom-doped nanodiamond according to any one of Items 1 to 10, where a shape of the nanodiamond is spherical, ellipsoidal, or polyhedral.

Item 12. The heteroatom-doped nanodiamond according to any one of Items 1 to 11, where a carbon content is from 70 to 99 mass %, a hydrogen content is from 0.1 to 5 mass %, and a nitrogen content is from 0.1 to 5 mass %.

Item 13. The heteroatom-doped nanodiamond according to any one of Items 1 to 12, where a ratio (D/G) of a peak area (D) of diamond to a peak area (G) of graphite by Raman spectroscopy is from 0.2 to 9.

Item 14. The heteroatom-doped nanodiamond according to any one of Items 1 to 13, where a ratio (H/D) of a peak area (H) of a surface hydroxy group (OH) to a peak area (D) of diamond by Raman spectroscopy is from 0.1 to 5.

Item 15. The heteroatom-doped nanodiamond according to any one of Items 1 to 14, where a ratio (C/D) of a peak area (C) of a surface carbonyl group (CO) to a peak area (D) of diamond by Raman spectroscopy is from 0.01 to 1.5.

Item 16. The heteroatom-doped nanodiamond according to any one of Items 1 to 15, comprising at least one oxygen-containing functional group terminal and/or at least one hydrogen-containing functional group terminal.

Item 17. The heteroatom-doped nanodiamond according to any one of Items 1 to 16, where a concentration of the at least one heteroatom-V center is $1\times10^{10}/cm^3$ or greater.

Advantageous Effects of Invention

With a known method in which non-doped nanodiamond particles placed on a silicon substrate is subjected to a CVD treatment and a nanodiamond layer doped with a heteroatom, such as Si or B, is allowed to grow, nanodiamond particles having a large average size of primary particles and/or a small specific surface area are formed, and also the shape becomes irregular.

On the other hand, for example, the heteroatom-doped nanodiamonds produced by detonation are nanodiamond particles having a small average size of primary particles and/or a large specific surface area, are nanosized and chemically stable, and does not exhibit degradation, fading, or flickering in vivo, and thus is expected as probes for fluorescence imaging. In addition, information on spins of electrons excited in the heteroatom-vacancy (V) luminescent center can be sometimes measured from outside, and thus the heteroatom-vacancy (V) luminescent center is also expected to be utilized in optically detected magnetic resonance (ODMR) or as a quantum bit.

BRIEF DESCRIPTION OF DRAWINGS

FIG. 1(a) is a brightness imaging at 738 nm of nanodiamonds obtained by using triphenylsilanol as a heteroatom compound in an addition amount, in terms of an external proportion, of 1 mass %. FIG. 1(b) is a fluorescence measurement result of the brightness of FIG. 1(a). FIG. 1(c) is an XRD measurement result of the sample after the mixed acid and alkali treatments. In FIG. 1(b), a sideband (shoulder peak) of fluorescence is present around 750 nm; however, this sideband might not be present depending on the sample.

DESCRIPTION OF EMBODIMENTS

The nanodiamond doped with a heteroatom according to an embodiment of the present invention satisfies criteria (i) and/or (ii) below:
(i) a BET specific surface area being from 20 to 900 $m^2/g$, and
(ii) an average size of primary particles being from 2 to 70 nm.

The heteroatom compound is a compound containing at least one heteroatom (atoms other than carbon) and may be an organic compound or an inorganic compound.

The heteroatom is selected from the group consisting of B, P, Si, S, Cr, Sn, Al, Ge, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, Pb, As, Sb, Bi, Se, Te, Co, Xe, F, Y, and lanthanoids, preferably selected from the group consisting of Si, Ge, Sn, B, P, Ni, Ti, Co, Xe, Cr, W, Ta, Zr, Zn, Ag, Pb, and lanthanoids, and further preferably selected from the group consisting of Si, Ge, Sn, B, P, Ni, Ti, Co, Xe, Cr, W, Ta, Zr, Zn, Ag, and Pb.

The preferred heteroatom to be used for doping of nanodiamonds is a Group 14 element selected from the group consisting of Si, Ge, Sn, and Pb, boron (B), phosphorus (P), and Ni, and a more preferred heteroatom is Si, B, and P.

In one preferred embodiment, the nanodiamond according to an embodiment of the present invention contains at least one selected from the group consisting of a Group 14 element selected from the group consisting of Si, Ge, Sn, and Pb, B, P, and Ni, and at least one other heteroatoms.

In another preferred embodiment, the nanodiamond according to an embodiment of the present invention contains at least one selected from the group consisting of Si, B, P, and Ni, and at least one other heteroatoms. The number of heteroatoms used for doping the nanodiamond is preferably from 1 to 5 types, more preferably from 1 to 4 types, and even more preferably 1 type, 2 types, or 3 types.

The heteroatom-doped nanodiamond according to a preferred embodiment of the present invention has a fluorescence emission peak. The heteroatom-doped nanodiamond according to another embodiment of the present invention contains at least one heteroatom-V center, and thus, has a fluorescence emission peak. The wavelength of the fluorescence emission peak is preferably from 720 to 770 nm, and more preferably from 730 to 760 nm, in the case where the heteroatom contains silicon; is preferably from 580 to 630 nm, and more preferably from 590 to 620 nm, in the case where the heteroatom contains germanium; is preferably from 590 to 650 nm, and more preferably from 600 to 640 nm, in the case where the heteroatom contains tin; and is preferably from 540 to 600 nm, and more preferably from 550 to 590 nm, in the case where the heteroatom contains lead.

In one preferred embodiment of the present invention, the doped nanodiamond emitting fluorescence of a heteroatom-vacancy center, the heteroatom being other than phosphorus and boron, may be further doped with phosphorus and/or boron. It is conceived that introduction of these atoms (B and/or P) has effects that electric charge of the heteroatom-V center, in which the heteroatom is one other than B and/or P, or defect (luminescent center) originated from another heteroatom for doping is adjusted, and the fluorescence is stabilized. Furthermore, the heteroatom-doped nanodiamond according to an embodiment of the present invention may contain a fluorescent emission by an N-V center. The N-V center is a luminescent center by nitrogen and vacancy and has a wide fluorescent spectrum with a peak by zero phonon line (ZPL) around 575 nm and/or around 637 nm, and for example, an excitation at 532 nm gives a wide fluorescent spectrum of approximately from 550 to 800 nm. For example, use of a heteroatom that is not directly related to fluorescence of phosphorus, boron, or the like is preferable for doping because the N-V center intensity may be increased. In one preferred embodiment of the present invention, the fluorescence emission peak of the nanodiamond in which the heteroatom is Si has a sharp peak of approximately 738 nm, which is called zero phonon level (ZPL).

The concentration of at least one the heteroatom-V center in the heteroatom-doped nanodiamond according to an embodiment of the present invention is preferably $1\times10^{10}/cm^3$ or greater, and more preferably from $2\times10^{10}$ to $1\times10^{19}/cm^3$. When the nanodiamond contains two or more heteroatom-V centers, the concentration of the heteroatom-V centers is a total concentration thereof. It is presumed that the concentration of the heteroatom-V center can be determined by using, for example, a confocal laser scanning microscope or a fluorescence and absorbance spectrometer. Note that, for determination of the concentration of heteroatom-V center by fluorescence and absorbance spectrometry, Literature (DOI 10.1002/pssa.201532174) can be used as a reference.

The BET specific surface area of the heteroatom-doped nanodiamond is preferably from 20 to 900 m$^2$/g, more preferably from 25 to 800 m$^2$/g, even more preferably from 30 to 700 m$^2$/g, and particularly preferably from 35 to 600 m$^2$/g. The BET specific surface area can be measured by nitrogen adsorption. Examples of a measurement instrument for the BET specific surface area include BELSORP-mini II (available from Microtrac BEL) and, for example, the BET specific surface area can be measured under the following conditions.

Measured powder amount: 40 mg
Preliminary drying: treated at 120° C. for 3 hours in a vacuum.
Measurement temperature: −196° C. (liquid nitrogen temperature)

The average size of the primary particles of the heteroatom-doped nanodiamonds is preferably from 2 to 70 nm, more preferably from 2.5 to 60 nm, even more preferably from 3 to 55 nm, and particularly preferably from 3.5 to 50 nm. The average size of the primary particles can be determined by Scherrer equation based on the analysis result of the powder X-ray diffractometry (XRD). Examples of a measurement instrument of XRD include the Multipurpose X-ray Diffraction System with Built-in Intelligent Guidance (available from Rigaku Corporation).

The carbon content of the heteroatom-doped nanodiamond according to an embodiment of the present invention is preferably from 70 to 99 mass %, more preferably from 75 to 98 mass %, and even more preferably from 80 to 97 mass %.

The hydrogen content of the heteroatom-doped nanodiamond according to an embodiment of the present invention is preferably from 0.1 to 5 mass %, more preferably from 0.2 to 4.5 mass %, and even more preferably from 0.3 to 4.0 mass %.

The nitrogen content of the heteroatom-doped nanodiamond according to an embodiment of the present invention is preferably from 0.1 to 5 mass %, more preferably from 0.2 to 4.5 mass %, and even more preferably from 0.3 to 4.0 mass %.

The content of carbon, hydrogen, and nitrogen of the heteroatom-doped nanodiamond can be measured by elementary analysis.

The heteroatom content of the heteroatom-doped nanodiamond according to an embodiment of the present invention is preferably from 0.0001 to 10.0 mass %, more preferably from 0.0001 to 5.0 mass %, and even more preferably from 0.0001 to 1.0 mass %. The heteroatom content can be measured by, for example, inductively-coupled plasma emission spectrometry (ICP-AES), XRF, secondary ion mass spectrometry (SIMS), and after alkali fusion, the heteroatom-doped nanodiamond can be quantified as an acidic solution. Furthermore, when the nanodiamond contains two or more heteroatoms, the content of the heteroatoms is a total content thereof.

For the heteroatom-doped nanodiamond according to a preferred embodiment of the present invention, characteristic peaks of diamond, graphite, surface hydroxy groups (OH), and surface carbonyl groups (CO) can be identified in a chart of Raman shift by Raman spectroscopy. The characteristic peak of diamond in a Raman shift chart is at from 1100 to 1400 cm$^{-1}$, the characteristic peak of graphite is at from 1450 to 1700 cm$^{-1}$, the characteristic peak of a surface hydroxy group (OH) is at from 1500 to 1750 cm$^{-1}$, and the characteristic peak of a surface carbonyl group (CO) is at from 1650 to 1800 cm$^{-1}$. The areas of characteristic peaks of diamond, graphite, a surface hydroxy group (OH), and a surface carbonyl group (CO) can be determined by Raman spectrometer. The laser wavelength of the Raman light source is, for example, 325 nm or 488 nm. As the Raman spectrometer, a confocal microscopic Raman spectrometer (e.g., trade name: Confocal Raman Microscope LabRAM HR Evolution, available from Horiba, Ltd.) can be used.

In the heteroatom-doped nanodiamond according to a preferred embodiment of the present invention, the ratio (D/G) of the peak area (D) of diamond to the peak area (G) of graphite is preferably from 0.2 to 9, more preferably from 0.3 to 8, and even more preferably from 0.5 to 7.

In the heteroatom-doped nanodiamond according to a preferred embodiment of the present invention, the ratio (H/D) of the peak area (H) of surface hydroxy group (OH) to the peak area (D) of diamond is preferably from 0.1 to 5, more preferably from 0.1 to 4.0, and even more preferably from 0.1 to 3.0.

In the heteroatom-doped nanodiamond according to a preferred embodiment of the present invention, the ratio (C/D) of the peak area (CO) of surface carbonyl group (C) to the peak area (D) of diamond is preferably from 0.01 to 1.5, more preferably from 0.03 to 1.2, and even more preferably from 0.05 to 1.0.

As the Raman spectroscopy method for the nanodiamonds, Literature (e.g., Vadym N. Mochalin et al., NATURE NANOTECHNOLOGY, 7 (2012) 11-23, especially FIG. 3) can be used as a reference.

In another preferred embodiment of the present invention, the surface of the heteroatom-doped nanodiamond may have at least one oxygen functional group terminal and/or at least one hydrogen terminal. Examples of the oxygen functional group terminal include OH, COOH, CONH$_2$, C=O, and CHO, and OH, C=O, and COOH are preferred. Examples of the hydrogen terminal include alkyl groups having from 1 to 20 carbons.

Presence of at least one the oxygen functional group terminal on the surface of the heteroatom-doped nanodiamond is preferred because aggregation of the nanodiamond particles can be suppressed. Presence of at least one the hydrogen terminal on the surface of the heteroatom-doped nanodiamond is preferred because the zeta potential becomes positive, and stable and high dispersion occurs in an acidic aqueous solution.

In another preferred embodiment of the present invention, the heteroatom-doped nanodiamond according to an embodiment of the present invention may have a core-shell structure. The core of the heteroatom-doped nanodiamond having a core-shell structure is the nanodiamond particle doped with at least one heteroatom. This core is preferably a core having the heteroatom-V center and emitting fluorescence. The shell is a non-diamond cover layer, may contain a sp2 carbon, and preferably further contains an oxygen atom. The shell may be a graphite layer. The thickness of the shell is preferably 5 nm or less, more preferably 3 nm or less, and even more preferably 1 nm or less. The shell may have a hydrophilic functional group on its surface.

Preferably, the heteroatom-doped nanodiamond can be produced by detonation. The shape of the heteroatom-doped nanodiamond is preferably spherical, ellipsoidal, or polyhedral close to these.

The degree of circularity is a numerical value to represent the complexity of a shape illustrated in, for example, an image. For the degree of circularity, the numerical value becomes smaller as the shape is more complex, while the maximum value thereof is 1. The degree of circularity can be determined by, for example, analyzing a TEM image of the heteroatom-doped nanodiamond by an image analysis software (e.g., winROOF) and using the following equation.

Degree of circularity=4π×(area)÷(circumference)^2

For example, in the case of a perfect circle having a radius of 10, the calculation equation becomes "4π×(10×10×π)÷(10×2×π)^2", and the degree of circularity results in 1 (maximum value). That is, in terms of the degree of circularity, the perfect circle is a shape that is the least complex. The degree of circularity of the heteroatom-doped nanodiamond is preferably 0.2 or greater, more preferably 0.3 or greater, and even more preferably 0.35 or greater.

In one preferred embodiment of the present invention, the center of the heteroatom-doped nanodiamond particle has a diamond structure including sp3 carbons and the heteroatoms for doping, and the surface thereof is covered with an amorphous layer formed from sp2 carbons. In a more preferred embodiment, the outer side of the amorphous layer may be covered with a graphite oxide layer. Furthermore, a hydration layer may be formed between the amorphous layer and the graphite oxide layer.

In one preferred embodiment of the present invention, the heteroatom-doped nanodiamond has a positive or negative zeta potential. The zeta potential of the heteroatom-doped nanodiamond is preferably from −70 to 70 mV, and more preferably from −60 to 30 mV.

The heteroatom-doped nanodiamond according to an embodiment of the present invention can be produced by a production method including mixing of an explosive composition containing at least one explosive and at least one heteroatom compound and exploding the obtained mixture in a sealed container. Examples of the container include metal containers and synthetic resin containers. The explosive and the heteroatom compound are preferably formed by pressing or casting. Examples of the method of producing particles (dry powder) of the explosive and the heteroatom compound include crystallization, crushing, and spray flash evaporation.

When the explosive composition is formed by pressing or casting, the explosive and the heteroatom compound are mixed as dry powder, as molten state, or by using a solvent. The form of the explosive and the heteroatom compound at the time of mixing may be any of the following four combinations:

Explosive (dry powder) and heteroatom compound (dry powder)
Explosive (dry powder) and heteroatom compound (molten state)
Explosive (molten state) and heteroatom compound (dry powder)
Explosive (molten state) and heteroatom compound (molten state)

Mixing of the explosive and the heteroatom compound may be performed in the presence or absence of a solvent, and formation can be performed by pressing or casting after the mixing.

The average particle diameters of the explosive and the heteroatom compound are preferably 10 mm or less, more preferably 5 mm or less, and even more preferably 1 mm or less. Note that these average particle diameters can be measured by laser diffraction/scattering methods, by an optical microscope, or by Raman method.

The product obtained by explosion can be further subjected to purification and a post treatment. The purification can include one or both of a mixed acid treatment and an alkali treatment. A preferred purification is a mixed acid treatment.

When the explosive composition containing the explosive and the heteroatom compound is exploded in a container, in addition to the heteroatom-doped nanodiamonds, for example, graphite, metal impurities, the elemental heteroatom, and heteroatom oxides are generated. Graphite and metal impurities can be removed by the mixed acid treatment. In the case where the heteroatom is a Group 14 element, such as Si, Ge, Sn, or Pb, elemental Group 14 elements (Si, Ge, Sn, Pb) and Group 14 element oxides (e.g., $SiO_2$, $GeO_2$, SnO, $SnO_2$, PbO, $PbO_2$) can be removed by the alkali treatment.

Examples of the mixed acid include a mixed acid of concentrated sulfuric acid and concentrated nitric acid, and the mixed acid is preferably a mixed acid of concentrated sulfuric acid:concentrated nitric acid=1:1 (volume ratio). The temperature for the mixed acid treatment is from 50 to 200° C., and the duration of the mixed acid treatment is from 0.5 to 24 hours.

Examples of the alkali include alkali metal hydroxides, such as sodium hydroxide and potassium hydroxide. The temperature of the alkali treatment is from 30 to 150° C., and the duration of the alkali treatment is from 0.5 to 24 hours.

The post treatment can include annealing and gas-phase oxidation. The heteroatom that is incorporated in the heteroatom-doped nanodiamond and vacancy are brought into contact due to the annealing treatment, and thus the heteroatom-V center can be formed. Furthermore, by the gas-phase oxidation, the graphite layer formed on the surface of the heteroatom-doped nanodiamond can be made thin or removed. Vacancy formation may be performed before the annealing although such vacancy formation is an optional process. The vacancy formation is performed by irradiation with an ion beam or an electron beam. Even in the case where no vacancy formation is performed, the heteroatom-V center is formed by annealing; however, by performing annealing after the vacancy formation, more heteroatom-V centers can be formed. For the density of vacancies to be introduced by ion beam irradiation or electron beam irradiation, the upper limit is limited by a concentration at which the diamond is broken (a vacancy concentration of $>1\times10^{21}/cm^3$), but the lower limit is, for example, $1\times10^{16}/cm^3$ or higher, or even $1\times10^{18}/cm^3$ or higher. The ion beam is preferably an ion beam of hydrogen (H) or helium (He). For example, the energy of the ion beam of hydrogen is preferably from 10 to 1500 keV, and the energy of the ion beam of helium is preferably from 20 to 2000 keV. The energy of the electron beam is preferably from 500 to 5000 keV The temperature of the annealing is preferably 800° C. or higher, and the annealing time is 30 minutes or longer.

The gas-phase oxidation can be performed in an air atmosphere, the gas-phase oxidation temperature is preferably 300° C. or higher, and the gas-phase oxidation time is 2 hours or longer.

The explosive is not particularly limited, and known explosives can be widely used. Specific examples thereof include trinitrotoluene (TNT), cyclotrimethylene trinitramine (hexogen, RDX), cyclotetramethylene tetranitramine (octogen), trinitrophenyl methylnitramine (tetryl), pentaerythritol tetranitrate (PETN), tetranitromethane (TNM), triamino-trinitrobenzene, hexanitrostilbene, and diaminodinitrobenzofuroxan. These explosives can be used singly, or in a combination of two or more.

The heteroatom compounds specifically exemplified below are merely examples, and well-known heteroatom compounds can be widely used.

In the case where the heteroatom is silicon, examples of the organic silicon compound include the following:

silane having a lower alkyl group, such as acetoxytrimethylsilane, diacetoxydimethylsilane, triacetoxymethylsilane, acetoxytriethylsilane, diacetoxydiethylsilane, triacetoxyethylsilane, acetoxytripropylsilane, methoxytrimethylsilane, dimethoxydimethylsilane, trimethoxymethylsilane, ethoxytrimethylsilane, diethoxydimethylsilane, triethoxymethylsilane, ethoxytriethylsilane, diethoxydiethylsilane, triethoxyethylsilane, and trimethylphenoxysilane;

silane having a halogen atom, such as trichloromethylsilane, dichlorodimethylsilane, chlorotrimethylsilane, trichloroethylsilane, dichlorodiethylsilane, chlorotriethylsilane, trichlorophenylsilane, dichlorodiphenylsilane, chlorotriphenylsilane, dichlorodiphenylsilane, dichloromethylphenylsilane, dichloroethylphenylsilane, chlorodifluoromethylsilane, dichlorofluoromethylsilane, chlorofluorodimethylsilane, chloroethyldifluorosilane, dichloroethylfluorosilane, chlorodifluoropropylsilane, dichlorofluoropropylsilane, trifluoromethylsilane, difluorodimethylsilane, fluorotrimethylsilane, ethyltrifluorosilane, diethyldifluorosilane, triethylfluorosilane, trifluoropropylsilane, fluorotripropylsilane, trifluorophenylsilane, difluorodiphenylsilane, fluorotriphenylsilane, tribromomethylsilane, dibromodimethylsilane, bromotrimethylsilane, bromotriethylsilane, bromotripropylsilane, dibromodiphenylsilane, and bromotriphenylsilane;

polysilane, such as hexamethyldisilane, hexaethyldisilane, hexapropyldisilane, hexaphenyldisilane, and octaphenylcyclotetrasilane;

silazane, such as triethylsilazane, tripropylsilazane, triphenylsilazane, hexamethyldisilazane, hexaethyldisilazane, hexaphenyldisilazane, hexamethylcyclotrisilazane, octamethylcyclotetrasilazane, hexaethylcyclotrisilazane, octaethylcyclotetrasilazane, and hexaphenylcyclotrisilazane;

aromatic silane in which a silicon atom is incorporated in an aromatic ring, such as silabenzene and disilabenzene;

hydroxy group-containing silane, such as trimethylsilanol, dimethylphenylsilanol, triethylsilanol, diethylsilanediol, tripropylsilanol, dipropylsilanediol, triphenylsilanol, and diphenylsilanediol;

alkyl- or aryl-substituted silane, such as tetramethylsilane, ethyltrimethylsilane, trimethylpropylsilane, trimethylphenylsilane, diethyldimethylsilane, triethylmethylsilane, methyltriphenylsilane, tetraethyl silane, triethylphenylsilane, diethyldiphenylsilane, ethyltriphenylsilane, and tetraphenylsilane;

carboxyl group-containing silane, such as triphenylsilylcarboxylic acid, trimethylsilyl acetic acid, trimethylsilylpropionic acid, and trimethylsilylbutyric acid;

siloxane, such as hexamethyldisiloxane, hexaethyldisiloxane, hexapropyldisiloxane, and hexaphenyldisiloxane;

silane having an alkyl group or an aryl group and a hydrogen atom, such as methylsilane, dimethylsilane, trimethylsilane, diethylsilane, triethylsilane, tripropylsilane, diphenylsilane, and triphenylsilane; and tetrakis(chloromethyl)silane, tetrakis(hydroxymethyl)silane, tetrakis(trimethylsilyl)silane, tetrakis(trimethylsilyl)methane, tetrakis(dimethylsilanolyl)silane, tetrakis(tri(hydroxymethyl)silyl)silane, and tetrakis(nitratemethyl)silane.

Examples of the inorganic silicon compound include silicon oxide, silicon oxynitride, silicon nitride, silicon oxycarbide, silicon nitrocarbide, silane, and carbon materials doped with silicon. Examples of the carbon material doped with silicon include black lead, graphite, active carbon, carbon black, ketjen black, coke, soft carbon, hard carbon, acetylene black, carbon fibers, and mesoporous carbon.

Examples of the boron compounds include inorganic boron compounds and organic boron compounds.

Examples of the inorganic boron compound include orthoboric acid, diboron dioxide, diboron trioxide, tetraboron trioxide, tetraboron pentoxide, boron tribromide, tetrafluoroboric acid, ammonium borate, and magnesium borate.

Examples of the organic boron compound include triethylborane, (R)-5,5-diphenyl-2-methyl-3,4-propano-1,3,2-oxazaborolidine, triisopropyl borate, 2-isopropoxy-4,4,5,5-tetramethyl-1,3,2-dioxaborolane, bis(hexylene glycolato) diboron, 4-(4,4,5,5-tetramethyl-1,3,2-dioxaborolan-2-yl)-1H-pyrazole, tert-butyl-N-[4-(4,4,5,5-tetramethyl-1,2,3-dioxaborolan-2-yl)phenyl]carbamate, phenylboronic acid, 3-acetylphenylboronic acid, boron trifluoride-acetic acid complex, boron trifluoride-sulfolane complex, 2-thiopheneboronic acid, and tris(trimethylsilyl) borate.

Examples of the phosphorus compounds include inorganic phosphorus compounds and organic phosphorus compounds. Examples of the inorganic phosphorus compound include ammonium polyphosphate.

Examples of the organic phosphorus compound include phosphates, such as trimethyl phosphate, triethyl phosphate, tripropyl phosphate, tributyl phosphate, tripentyl phosphate, trihexyl phosphate, dimethylethyl phosphate, methyldibutyl phosphate, ethyldipropyl phosphate, 2-ethylhexyldi(p-tolyl) phosphate, bis(2-ethylhexyl)p-tolyl phosphate, tritolylphosphate, di(dodecyl)p-tolyl phosphate, tris(2-butoxyethyl) phosphate, tricyclohexyl phosphate, triphenyl phosphate, ethyldiphenyl phosphate, dibutylphenyl phosphate, phenylbisdodecyl phosphate, cresyldiphenyl phosphate, tricresyl phosphate, p-tolylbis(2,5,5'-trimethylhexyl) phosphate, cresyl-2,6-xylenyl phosphate, trixylenyl phosphate, hydroxyphenyldiphenyl phosphate, tris(t-butylphenyl) phosphate, tris(i-propylphenyl) phosphate, 2-ethylhexyldiphenyl phosphate, bis(2-ethylhexyl)phenyl phosphate, tri(nonylphenyl) phosphate, and phenyl bisneopentyl phosphate;

condensed phosphates, such as 1,3-phenylene bis(diphenyl phosphate), 1,4-phenylene bis(dixylenyl phosphate), 1,3-phenylene bis(3,5,5'-trimethylhexyl phosphate), bisphenol A bis(diphenyl phosphate), 4,4'-biphenyl bis(dixylenyl phosphate), and 1,3,5-phenylene tris(dixylenyl phosphate), phosphites, such as trimethyl phosphite, triethyl phosphite, triphenyl phosphite, and tricresyl phosphite; and phosphites, such as 1,3-phenylene bis(diphenyl phosphite), 1,3-phenylene bis(dixylenyl phosphite), 1,4-phenylene bis(3,5,5'-trimethylhexyl phosphite), bisphenol A bis(diphenyl phosphite), 4,4'-biphenyl bis(dixylenyl phosphite), and 1,3,5-phenylene tris(dixylenyl phosphite).

Examples of the germanium compound include organic germanium compounds, such as methylgermane, ethylgermane, trimethylgermanium methoxide, dimethylgermanium diacetate, tributylgermanium acetate, tetramethoxygermanium, tetraethoxygermanium, isobutylgermane, alkylgermanium trichloride, and dimethylaminogermanium trichloride, germanium complexes, such as nitrotriphenol complex ($Ge_2(ntp)_2O$), catechol complex ($Ge(cat)_2$) or aminopyrene complex ($Ge_2(ap)_2Cl_2$), and germanium alkoxide, such as germanium ethoxide and germanium tetrabutoxide.

Examples of the tin compound include inorganic tin compounds, such as tin(II) oxide, tin(IV) oxide, tin(II)

sulfide, tin(IV) sulfide, tin(II) chloride, tin(IV) chloride, tin(II) bromide, tin(II) fluoride, tin acetate, and tin sulfate, alkyl tin compounds, such as tetramethyltin, monoalkyltin oxide compounds, such as monobutyltin oxide, dialkyltin oxide compounds, such as dibutyltin oxide, aryltin compounds, such as tetraphenyltin, and organic tin compounds, such as dimethyltin maleate, hydroxybutyltin oxide, and monobutyltin tris(2-ethylhexanoate).

Examples of the nickel compound include divalent nickel halides, such as nickel(II) chloride, nickel(II) bromide, and nickel(II) iodide, inorganic nickel compounds, such as nickel(II) acetate and nickel(II) carbonate, and organic nickel compounds, such as nickel bis(ethyl acetoacetate) and nickel bis(acetylacetonate).

Examples of the titanium compound include inorganic titanium compounds, such as titanium dioxide, titanium nitride, strontium titanate, lead titanate, barium titanate, and potassium titanate; tetraalkoxy titanium, such as tetraethoxy titanium, tetraisopropoxy titanium, and tetrabutyloxy titanium; and organic titanium compounds, such as tetraethylene glycol titanate, di-n-butyl bis(triethanolamine) titanate, di-isopropoxy titanium bis(acetylacetonate), isopropoxy titanium octanoate, isopropyl titanium trimethacrylate, isopropyl titanium triacrylate, isopropyl triisostearoyl titanate, isopropyl tridecylbenzenesulfonyl titanate, isopropyl tris (butylmethylpyrophosphate) titanate, tetraisopropyl di(dilaurylphosphite) titanate, dimethacryloxy acetate titanate, diacryloxy acetate titanate, di(dioctylphosphate)ethylene titanate, isopropoxy titanium tri(dioctylphosphate), isopropyl tris(dioctylpyrophosphate) titanate, tetraisopropyl bis (dioctylphosphite) titanate, tetraoctyl bis(ditridecylphosphite) titanate, tetra(2,2-diallyloxymethyl-1-butyl) bis(ditridecyl)phosphite titanate, bis(dioctylpyrophosphate) oxyacetate titanate, tris(dioctylpyrophosphate)ethylene titanate, isopropyltri-n-dodecylbenzene sulfonyl titanate, isopropyltrioctanoyl titanate, isopropyldimethacryloyl isostearoyl titanate, isopropylisostearoyldiacryl titanate, isopropyltri(dioctylphosphate) titanate, isopropyltricumylphenyl titanate, and isopropyltri(N-aminoethyl-aminoethyl) titanate.

Examples of the cobalt compound include inorganic cobalt compounds, such as cobalt salts of inorganic acids, cobalt halides, cobalt oxide, cobalt hydroxide, dicobalt octacarbonyl, cobalt hydrogen tetracarbonyl, tetracobalt dodecacarbonyl, and alkylidyne tricobalt nonacarbonyl; cobalt salts of organic acids (e.g., acetate, propionate, cyanides, naphthenate, and stearate; alkyl sulfonates (e.g., $C_{6-18}$ alkylsulfonates), such as methanesulfonate, ethanesulfonate, octanesulfonate, and dodecanesulfonate; aryl sulfonates that may be substituted with an alkyl group (e.g., $C_{6-18}$ alkyl-aryl sulfonates), such as benzenesulfonate, p-toluenesulfonate, naphthalene sulfonate, decylbenzene sulfonate, and dodecylbenzene sulfonate), such as cobalt tris(acetylacetate), and cobalt tris(acetylacetonate); and organic cobalt complexes. Examples of the ligand constituting a complex include hydroxy (OH), alkoxy (e.g., methoxy, ethoxy, propoxy, and butoxy), acyl (e.g., acetyl and propionyl), alkoxy carbonyl (e.g., methoxy carbonyl and ethoxy carbonyl), acetylacetonate, a cyclopentadienyl group, halogen atoms (e.g., chlorine and bromine), CO, CN, an oxygen atom, aquo ($H_2O$), phosphorus compounds such as phosphine (e.g., triaryl phosphines, such as triphenylphosphine), and nitrogen-containing compounds, such as ammine ($NH_3$), NO, nitro ($NO_2$), nitrato ($NO_3$), ethylenediamine, diethylenetriamine, pyridine, and phenanthroline.

Examples of the xenon compound include fluorides such as $XeF_2$, $XeF_4$, $XeF_6$, $XeOF_2$, $XeOF_4$, and $XeO_2F_4$, oxides such as $XeO_3$ and $XeO_4$, xenon acid $Xe(OH)_6$ and its salt $Ba_3XeO_6$, perxenic acid $H_4XeO_6$ and its salt $Na_4XeO_6$, complexes with metal carbonyl $M(CO)_5Xe$ (M=Cr, Mo, W), and hydrates.

Examples of the chromium compound include chromium acetylacetone complexes, such as acetylacetone chromium; chromium alkoxide, such as chromium(III) isopropoxide; organic acid chromium, such as chromium(II) acetate and chromium(III) acetate hydroxide; organic chromium compounds, such as tris(allyl) chromium, tris(methallyl) chromium, tris(crotyl) chromium, bis(cyclopentadienyl) chromium (i.e. chromocene), bis(pentamethylcyclopentadienyl) chromium (i.e. decamethylchromocene), bis(benzene) chromium, bis(ethylbenzene) chromium, bis(mesitylene) chromium, bis(pentadienyl) chromium, bis(2,4-dimethylpentadienyl) chromium, bis(allyl)tricarbonyl chromium, (cyclopentadienyl)(pentadienyl) chromium, tetra(1-norbornyl) chromium, (trimethylenemethane)tetracarbonyl chromium, bis(butadiene)dicarbonyl chromium, (butadiene)tetracarbonyl chromium, and bis(cyclooctatetraene) chromium.

Examples of the tungsten compound include inorganic tungsten compounds, such as tungsten trioxide, ammonium tungstate, and sodium tungstate; and organic tungsten compounds, such as tungsten complexes coordinated with boron atoms, such as one coordinated with ethylborylethylidene ligands; tungsten complexes coordinated with carbon atoms, such as one coordinated with carbonyl ligands, cyclopentadienyl ligands, alkyl group ligands, and olefin-based ligands; tungsten complexes coordinated with nitrogen atoms, such as one coordinated with pyridine ligands and acetonitrile ligands; tungsten complexes coordinated with phosphorus atoms, such as one coordinated with phosphine ligands and phosphite ligands; and tungsten complexes coordinated with sulfur atoms, such as one coordinated with diethyl carbamodithioato ligands.

Examples of the thallium compound include inorganic thallium compounds, such as thallium nitrate, thallium sulfate, thallium fluoride, thallium chloride, thallium bromide, and thallium iodide; organic thallium compounds, such as trialkyl thallium, such as trimethyl thallium, triethyl thallium, and triisobutyl thallium; aryl thallium, such as dialkyl thallium halide, alkenyl dialkyl thallium, alkynyl dialkyl thallium, triphenyl thallium, and tritolyl thallium; diaryl thallium halide, thallium 2-ethylhexanoate, thallium malonate, thallium formate, thallium ethoxide, and thallium acetylacetonate.

Examples of the zirconium compound include inorganic zirconium compounds, such as zirconium nitrate, zirconium sulfate, zirconium carbonate, zirconium hydroxide, zirconium fluoride, zirconium chloride, zirconium bromide, and zirconium iodide; and organic zirconium compounds, such as zirconium n-propoxide, zirconium n-butoxide, zirconium t-butoxide, zirconium isopropoxide, zirconium ethoxide, zirconium acetate, zirconium acetylacetonate, zirconium butoxyacetylacetonate, zirconium bisacetylacetonate, zirconium ethylacetoacetate, zirconium acetylacetonate bisethylacetoacetate, zirconium hexafluoroacetylacetonate, and zirconium trifluoroacetylacetonate.

Examples of the zinc compound include diethylzinc, dimethylzinc, zinc acetate, zinc nitrate, zinc stearate, zinc oleate, zinc palmitate, zinc myristate, zinc dodecanoate, zinc acetylacetonate, zinc chloride, zinc bromide, zinc iodide, and zinc carbamate.

Examples of the silver compound include organic silver compounds, such as silver acetate, silver pivalate, silver trifluoromethanesulfonate, and silver benzoate; and inorganic silver compounds, such as silver nitrate, silver fluoride, silver chloride, silver bromide, silver iodide, silver sulfate, silver oxide, silver sulfide, silver tetrafluoroborate, silver hexafluorophosphate (AgPF$_6$), and silver hexafluoroantimonate (AgSbF6).

Examples of the lead compound include inorganic lead compounds, such as lead monoxide (PbO), lead dioxide (PbO$_2$), minium (Pb$_3$O$_4$), white lead (2PbCO$_3$·Pb(OH)$_2$), lead nitrate (Pb(NO$_3$)$_2$), lead chloride (PbCl$_2$), lead sulfide (PbS), chrome yellow (PbCrO$_4$, Pb(SCr)O$_4$, PbO·PbCrO$_4$), lead carbonate (PbCO$_3$), lead sulfate (PbSO$_4$), lead fluoride (PbF$_2$), lead tetrafluoride (PbF$_4$), lead bromide (PbBr$_2$), and lead iodide (PbI$_2$), and organic lead compounds, such as lead acetate (Pb(CH$_3$COO)$_2$), lead tetracarboxylate (Pb(OCOCH$_3$)$_4$), tetraethyl lead (Pb(CH$_3$CH$_2$)$_4$), tetramethyl lead (Pb(CH$_3$)$_4$), and tetrabutyl lead (Pb(C$_4$H$_9$)$_4$).

Examples of the aluminum compound include inorganic aluminum compounds, such as aluminum oxide; alkoxy compounds, such as trimethoxy aluminum, triethoxy aluminum, isopropoxy aluminum, isopropoxydiethoxy aluminum, and tributoxy aluminum; acyloxy compounds, such as triacetoxy aluminum, tristearate aluminum, and tributyrate aluminum; and organic aluminum compounds, such as aluminum isopropylate, aluminum sec-butylate, aluminum tert-butylate, aluminum tris(ethylacetoacetate), tris(hexafluoroacetylacetonate) aluminum, tris(ethylacetoacetate) aluminum, tris(n-propylacetoacetate) aluminum, tris(isopropylacetoacetate) aluminum, tris(n-butylacetoacetate) aluminum, tris(salicylaldehyde) aluminum, tris(2-ethoxycarbonylphenolate) aluminum, tris(acetylacetonate) aluminum, trialkyl aluminum compounds, such as trimethyl aluminum, triethyl aluminum, and triisobutyl aluminum, dialkyl aluminum halide, alkenyl dialkyl aluminum, alkynyl dialkyl aluminum, aryl aluminum such as triphenyl aluminum and tritolyl aluminum, and diaryl aluminum halides.

Examples of the vanadium compound include vanadic acid and metavanadic acid and inorganic vanadium compounds of alkali metal salts of these; alkoxides, such as triethoxyvanadyl, pentaethoxy vanadium, triamyloxyvanadyl, and triisopropoxyvanadyl; acetonates, such as bisacetylacetonate vanadyl, vanadium acetylacetonate, vanadyl acetylacetonate, and vanadium oxyacetylacetonate; and organic vanadium compounds, such as vanadium stearate, vanadium pivalate, and vanadium acetate.

Examples of the niobium compound include halides such as niobium(V) chloride and niobium(V) fluoride; inorganic niobium compounds, such as niobium sulfate, niobic acid, and niobate; and organic niobium compounds, such as niobium alkoxide.

Examples of the tantalum compound include inorganic tantalum compounds, such as TaCl$_5$ and TaF$_5$; and organic tantalum compounds, such as Ta(OC$_2$H$_5$)$_5$, Ta(OCH$_3$)$_5$, Ta(OC$_3$H$_7$)$_5$, Ta(OC$_4$H$_9$)$_5$, (C$_5$H$_5$)$_2$TaH$_3$, and Ta(N(CH$_3$)$_2$)$_5$.

Examples of the molybdenum compound include inorganic molybdenum compounds, such as molybdenum trioxide, zinc molybdate, ammonium molybdate, magnesium molybdate, calcium molybdate, barium molybdate, sodium molybdate, potassium molybdate, phosphomolybdic acid, ammonium phosphomolybdate, sodium phosphomolybdate, silicomolybdic acid, molybdenum disulfide, molybdenum diselenide, molybdenum ditelluride, molybdenum boride, molybdenum disilicide, molybdenum nitride, and molybdenum carbide; and organic molybdenum compounds, such as molybdenum dialkyldithiophosphate and molybdenum dialkyldithiocarbamate.

Examples of the manganese compound include inorganic manganese compounds, such as hydroxides, nitrates, acetates, sulfates, chlorides, and carbonates of manganese; and organic manganese compounds including manganese oxalate, acetylacetonate compounds, and a manganese alkoxide such as methoxide, ethoxide, or butoxide.

Examples of the iron compound include inorganic iron compounds, such as iron(II) fluoride, iron(III) fluoride, iron(II) chloride, iron(III) chloride, iron(II) bromide, iron (III) bromide, iron(II) iodide, iron(III) iodide, iron(II) oxide, iron(III) oxide, triiron(II, III) tetroxide, iron(II) sulfate, iron(III) sulfate, iron(II) nitrate, iron(III) nitrate, iron(II) hydroxide, iron(III) hydroxide, iron(II) perchlorate, iron(III) perchlorate, ammonium iron(II) sulfate, ammonium iron(III) sulfate, iron(III) tungstate oxide, iron(III) tetravanadate, iron(II) selenide, iron(II) titanium trioxide, diiron(III) titanium pentoxide, iron(II) sulfide, iron(III) sulfide, diiron(II) phosphide, triiron(II) phosphide, and iron(III) phosphide; and organic iron compounds, such as iron(II) acetate, iron (III) acetate, iron(II) formate, iron(III) triformate, iron(II) tartrate, sodium iron(III) tartrate, iron(II) lactate, iron(II) oxalate, iron(III) oxalate, ammonium iron(III) citrate, iron (III) laurate, iron(III) stearate, iron(III) tripalmitate, potassium hexacyanoferrate(II), potassium hexacyanoferrate(III), bis(2,4-pentanedionato)diaqua iron(II), tris(2,4-pentanedionato) iron(III), potassium tris(oxalato)ferrate (III), iron(III) tris(trifluoromethanesulfonate), iron(III) p-toluenesulfonate, iron(III) dimethyldithiocarbamate, iron(III) diethyldithiocarbamate, and ferrocene.

Examples of the copper compound include organic copper compounds, such as copper oxalate, copper stearate, copper formate, copper tartrate, copper oleate, copper acetate, copper gluconate, and copper salicylate; and inorganic copper compounds, such as copper carbonate, copper chloride, copper bromide, copper iodide, copper phosphate, and natural minerals such as hydrotalcite, stichtite, and pyrolite.

Examples of the cadmium compound include inorganic cadmium compounds, such as cadmium fluoride, cadmium chloride, cadmium bromide, cadmium iodide, cadmium oxide, and cadmium carbonate; and organic cadmium compounds such as cadmium phthalate and cadmium naphthalate.

Examples of the mercury compound include inorganic mercury compounds, such as mercury(II) chloride, mercury sulfate, and mercury(II) nitrate; and organic mercury compounds, such as methyl mercury, methylmercuric chloride, ethyl mercury, ethylmercuric chloride, phenylmercuric acetate, thimerosal, para-chloromercuribenzoate, and fluorescein mercuric acetate.

Examples of the gallium compound include organic gallium compounds, such as tetraphenyl gallium and tetrakis (3,4,5-trifluorophenyl) gallium; and inorganic gallium compounds, such as gallium oxoate, gallium halides, gallium hydroxide, and gallium cyanide.

Examples of the indium compound include organic indium compounds, such as triethoxyindium, indium 2-ethylhexanoate, and indium acetylacetonate; and inorganic indium compounds, such as indium cyanide, indium nitrate, indium sulfate, indium carbonate, indium fluoride, indium chloride, indium bromide, and indium iodide.

Examples of the arsenic compound include inorganic arsenic compounds, such as diarsenic trioxide, diarsenic pentoxide, arsenic trichloride, arsenic pentoxide, and arsenious acid and arsenic acid and salts thereof, including sodium arsenite, ammonium arsenite, potassium arsenite, ammonium arsenate, and potassium arsenate; and organic arsenic compounds, such as cacodylic acid, phenylarsonic acid, diphenylarsonic acid, p-hydroxyphenylarsonic acid, p-aminophenylarsonic acid, and salts thereof, including sodium cacodylate and potassium cacodylate.

Examples of the antimony compound include inorganic antimony compounds, such as antimony oxide, antimony phosphate, KSb(OH), and $NH_4SbF_6$; and organic antimony compounds, such as antimony esters of organic acids, cyclic alkyl antimonite, and triphenylantimony.

Examples of the bismuth compound include organic bismuth compounds, such as triphenyl bismuth, bismuth 2-ethylhexanoate, and bismuth acetylacetonate; and inorganic bismuth compounds, such as bismuth nitrate, bismuth sulfate, bismuth acetate, bismuth hydroxide, bismuth fluoride, bismuth chloride, bismuth bromide, and bismuth iodide.

Examples of the selenium compound include organic selenium compounds, such as selenomethionine, selenocysteine, and selenocystine; and inorganic selenium compounds, such as alkali metal selenates such as potassium selenate, and alkali metal selenites such as sodium selenite.

Examples of the tellurium compound include telluric acid and salts thereof, tellurium oxide, tellurium chloride, tellurium bromide, tellurium iodide, and tellurium alkoxide.

Examples of the magnesium compound include organic magnesium compounds, such as ethyl acetoacetate magnesium monoisopropylate, magnesium bis(ethylacetoacetate), alkylacetoacetate magnesium monoisopropylate, and magnesium bis(acetylacetonate); and inorganic magnesium compounds, such as magnesium oxide, magnesium sulfate, magnesium nitrate, and magnesium chloride.

Examples of the calcium compound include organic calcium compounds, such as calcium 2-ethylhexanoate, calcium ethoxide, calcium methoxide, calcium methoxyethoxide, and calcium acetylacetonate; and inorganic calcium compounds, such as calcium nitrate, calcium sulfate, calcium carbonate, calcium phosphate, calcium hydroxide, calcium cyanide, calcium fluoride, calcium chloride, calcium bromide, and calcium iodide.

As the heteroatom compound in which the heteroatom is Li, Na, K, Cs, S, Sr, Ba, F, Y, or lanthanoids, a known organic or inorganic compound can be used.

A single heteroatom compound may be used alone, or two or more heteroatom compounds may be used in combination.

The proportion of the explosive in the mixture containing the explosive and the heteroatom compound is preferably from 80 to 99.9999 mass %, more preferably from 85 to 99.999 mass %, even more preferably from 90 to 99.99 mass %, and particularly preferably from 95 to 99.9 mass %. The proportion of the heteroatom compound is preferably from 0.0001 to 20 mass %, more preferably from 0.001 to 15 mass %, even more preferably from 0.01 to 10 mass %, and particularly preferably from 0.1 to 5 mass %. Furthermore, the heteroatom content in the mixture containing the explosive and the heteroatom compound is preferably from 0.000005 to 10 mass %, more preferably from 0.00001 to 8 mass %, even more preferably from 0.0001 to 5 mass %, particularly preferably from 0.001 to 3 mass %, and most preferably from 0.01 to 1 mass %.

Mixing of the explosive and the heteroatom compound may be performed by powder mixing in the case where these are solids, by melting, or by mixing through dissolving or dispersing them in an appropriate solvent. The mixing can be also performed by agitation, bead milling, or ultrasonic waves.

In one preferred embodiment, the explosive composition containing the explosive and the heteroatom compound further contains a cooling medium. The cooling medium may be solid, liquid, or gas. Examples of the method of using the cooling medium include a method of detonating the mixture of the explosive and the heteroatom compound in the cooling medium. Examples of the cooling medium include inert gases (nitrogen, argon, CO), water, ice, liquid nitrogen, aqueous solutions of heteroatom-containing salts, and crystalline hydrates. Examples of the heteroatom-containing salt include ammonium hexafluorosilicate, ammonium silicate, and tetramethylammonium silicate. The cooling medium is preferably used in an amount approximately 5 times the weight of the explosive, for example, in the case of water or ice.

In one preferred embodiment of the present invention, the mixture containing the explosive and the heteroatom compound is transformed into diamonds through compression by shock wave under high pressure and high temperature conditions generated by explosion of the explosive (detonation). At the time of explosion of the explosive, the heteroatom is incorporated into the diamond lattice. The carbon source of the nanodiamonds can be the explosive and the organic heteroatom compound; however, in the case where the mixture containing the explosive and the heteroatom compound further contains a carbon material that contains no heteroatom, this carbon material may be the carbon source of the nanodiamonds.

EXAMPLES

Hereinafter, the present invention will be described more specifically with reference to examples, but the present invention is not limited by these examples.

Examples 1 to 6

Using TNT as the explosive and using, as the heteroatom compound, the dopants shown in Table 1 in the number of moles shown in Table 1 relative to 1 mol of TNT, production of silicon-doped nanodiamonds was performed by detonation in accordance with an ordinary method under conditions including the temperature (K) and the pressure (GPa) shown in Table 1, and thus the nanodiamonds doped with silicon in a proportion shown in Table 1 can be obtained.

The names and structural formulas of the dopant molecules (silicon compounds) 1 to 6 used for doping with silicon are shown below.

Dopant molecule 1: Siline

Dopant molecule 2: Tetramethylsilane ($SiMe_4$)

Dopant molecule 3: Tetrakis(nitratemethyl)silane (Si-PETN)

Dopant molecule 4: Tetrakis(dimethylsilanolyl)silane (Si$(SiMe_2OH)_4$)

Dopant molecule 5: Tetrakis(trimethylsilyl)silane (Si$(SiMe_3)_4$)

Dopant molecule 6: Tetrakis(trimethylsilyl)methane (C$(SiMe_3)_4$)

TABLE 1

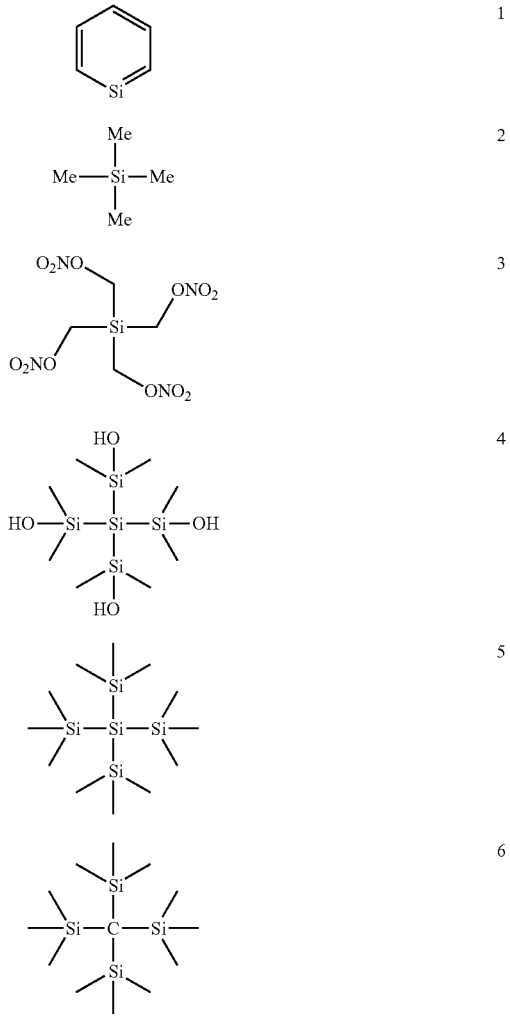

| Examples | Dopant molecule | Proportion of dopant molecule used in TNT288 molecule | TEMPERATURE [K] | Pressure [GPa] | (Si atom/ C atom) × 100 (%) |
|---|---|---|---|---|---|
| 1 | Siline | 56/288 = 0.19 | 3521 | 33 | 3.2 |
| 2 | SiMe$_4$ | 60/288 = 0.21 | 3525 | 34 | 2.3 |
| 3 | SiPETN | 48/288 = 0.17 | 3508 | 29 | 3.1 |
| 4 | Si(SiMe$_2$OH)$_4$ | 60/288 = 0.21 | 3528 | 33 | 32.3 |
| 5 | Si(SiMe$_3$)$_4$ | 60/288 = 0.21 | 3518 | 31 | 36.0 |
| 6 | C(SiMe$_3$)$_4$ | 60/288 = 0.21 | 3518 | 30 | 22.7 |

As is clear from Table 1, it is apparent that nanodiamonds to which a large amount of silicon atoms have been introduced can be obtained according to embodiments of the present invention.

Example 7

Using approximately 60 g of an explosive composition obtained by adding 10 parts by mass, 1 part by mass, or 0.1 parts by mass of triphenylsilanol as a heteroatom compound into 100 parts by mass of explosive containing trinitrotoluene (TNT) and cyclotrimethylene trinitramine (RDX), silicon-doped nanodiamonds were produced in accordance with an ordinary method for nanodiamond production. For the obtained silicon-doped nanodiamonds, the following treatments were performed. Note that the added amount of triphenylsilanol in the explosive was 10 mass %, 1 mass %, or 0.1 mass %.

(i) Mixed Acid Treatment

In 2800 g of a mixed acid of concentrated sulfuric acid:concentrated nitric acid=11:1 (weight ratio), 15 g of the nanodiamonds obtained by the detonation test was added and treated at 150° C. for 10 hours while being agitated.

(ii) Alkali Treatment

In 100 mL of an 8 N sodium hydroxide aqueous solution, 1 g of the nanodiamonds that had been treated with the mixed acid was added and treated at 100° C. for 10 hours while being agitated.

(iii) Annealing

The nanodiamonds after the alkali treatment were annealed at 800° C. in a vacuum atmosphere for 30 minutes.

(iv) Gas-Phase Oxidation

The nanodiamonds that had been annealed was subjected to a gas-phase oxidation treatment at 300° C. in an air atmosphere for 2 hours, and thus the silicon-doped nanodiamonds according to an embodiment of the present invention were obtained.

(v) Fluorescence Analysis

An aqueous suspension of 10 w/v % of the silicon-doped nanodiamonds according to an embodiment of the present invention obtained by the gas-phase oxidation was added dropwise on a glass substrate and dried, and thus an evaluation sample was prepared. The obtained evaluation sample was subjected to high-speed mapping using a confocal microscopic Raman spectrometer (trade name: Confocal Raman Microscope LabRAM HR Evolution, available from Horiba, Ltd.), and brightness imaging at 738 nm was performed. FIG. 1(a) shows the brightness images at 738 nm of the silicon-doped nanodiamonds obtained using triphenylsilanol as the silicon compound in an addition amount, in terms of an external proportion, of 1 mass %. FIG. 1(b) shows a fluorescence spectrum of brightness of FIG. 1(a). The zero phonon line (fluorescence peak) of the Si-V center can be confirmed. The Si content of the obtained silicon-doped nanodiamonds was 3.2 mass % when the added amount of triphenylsilanol in the explosive was 10 mass %, 0.15 mass % when the added amount was 1 mass %, and 0.03 mass % when the added amount was 0.1 mass %.

From FIG. 1(b), it was confirmed that the silicon-doped nanodiamond according to an embodiment of the present invention has fluorescence at 738 nm originated from the Si-V center. Furthermore, the average size of the primary particles measured by XRD and the BET specific surface area of the obtained silicon-doped nanodiamonds are shown in Table 2 below.

TABLE 2

| Added amount of triphenylsilanol in explosive | BET specific surface area (m$^2$/g) | Average size of primary particles (nm) |
|---|---|---|
| 10 mass % | 213 | 7.9 |
| 1 mass % | 232 | 7.2 |
| 0.1 mass % | 254 | 6.9 |

Measurement of BET specific surface area
Instrument: BELSORP-mini II (available from Microtrac BEL)
Measured powder amount: 40 mg
Preliminary drying: treated at 120° C. for 3 hours in a vacuum
Measurement temperature: −196° C. (liquid nitrogen temperature)
Measurement of average size of primary particles (powder X-ray diffractometry (XRD))
Instrument: Multipurpose X-ray Diffraction System with Built-in Intelligent Guidance (available from Rigaku Corporation)
Measurement method of Si introduction amount (XRF)
Instrument: X-ray Fluorescence Spectrometer ZSX Primus IV, available from Rigaku Corporation Example 8

Nanodiamonds doped with boron can be obtained in the same manner as in Example 7 except for using 1 part by mass of phenylboronic acid in place of 1 part by mass of triphenylsilanol of Example 7.

Example 9

Nanodiamonds doped with phosphorus can be obtained in the same manner as in Example 7 except for using 1 part by mass of triphenylphosphine in place of 1 part by mass of triphenylsilanol of Example 7.

Example 10

Nanodiamonds doped with nickel can be obtained in the same manner as in Example 7 except for using 1 part by mass of nickel bis(acetylacetonate) in place of 1 part by mass of triphenylsilanol of Example 7.

Example 11

Nanodiamonds doped with silicon and boron can be obtained in the same manner as in Example 7 except for using 0.5 parts by mass of triphenylsilanol and 0.5 parts by mass of phenylboronic acid in place of 1 part by mass of triphenylsilanol of Example 7.

Example 12

Nanodiamonds doped with silicon and phosphorus can be obtained in the same manner as in Example 7 except for using 0.5 parts by mass of triphenylsilanol and 0.5 parts by mass of triphenylphosphine in place of 1 part by mass of triphenylsilanol of Example 7.

The invention claimed is:

1. Heteroatom-doped nanodiamond particles, wherein
   the heteroatom-doped nanodiamond particles being doped with at least one heteroatom, and
   the heteroatom-doped nanodiamond particles satisfying requirements (i) to (iv) below:
   (i) a BET specific surface area being from 35 to 600 m$^2$/g,
   (ii) an average size of primary particles being from 3 to 55 nm,
   (iii) a carbon content being from 70 to 99 mass %, a hydrogen content being from 0.1 to 5 mass %, and a nitrogen content being from 0.1 to 5 mass %, and
   (iv) a ratio (D/G) of a peak area (D) of diamond to a peak area (G) of graphite by Raman spectroscopy being from 0.2 to 9,
   wherein the heteroatom-doped nanodiamond has a fluorescence emission peak originated from at least one heteroatom-vacancy center, and
   wherein the heteroatom comprises at least one selected from the group consisting of Group 14 elements, nickel and boron.

2. The heteroatom-doped nanodiamond particles according to claim 1, wherein the heteroatom-doped nanodiamond emitting fluorescence is further doped with phosphorus and/or boron.

3. The heteroatom-doped nanodiamond particles according to claim 1, wherein the heteroatom-doped nanodiamond has the fluorescence emission peak at from 720 to 770 nm, and the heteroatom comprises silicon.

4. The heteroatom-doped nanodiamond particles according to claim 1, wherein the heteroatom-doped nanodiamond has the fluorescence emission peak at from 580 to 630 nm, and the heteroatom comprises germanium.

5. The heteroatom-doped nanodiamond particles according to claim 1, wherein the heteroatom-doped nanodiamond has the fluorescence emission peak at from 590 to 650 nm, and the heteroatom comprises tin.

6. The heteroatom-doped nanodiamond particles according to claim 1, wherein the nanodiamond has a fluorescence emission peak at from 540 to 600 nm, and the heteroatom comprises lead.

7. The heteroatom-doped nanodiamond particles according to claim 1, which produces fluorescence due to a nitrogen-vacancy (N-V) center.

8. The heteroatom-doped nanodiamond particles according to claim 1, wherein a shape of the nanodiamond is spherical, ellipsoidal, or polyhedral.

9. The heteroatom-doped nanodiamond particles according to claim 1, wherein a ratio (H/D) of a peak area (H) of a surface hydroxy group (OH) to a peak area (D) of diamond by Raman spectroscopy is from 0.1 to 5.

10. The heteroatom-doped nanodiamond particles according to claim 1, wherein a ratio (C/D) of a peak area (C) of a surface carbonyl group (CO) to a peak area (D) of diamond by Raman spectroscopy is from 0.01 to 1.5.

11. The heteroatom-doped nanodiamond particles according to claim 1, comprising at least one oxygen-containing functional group terminal and/or at least one hydrogen-containing functional group terminal.

12. The heteroatom-doped nanodiamond particles according to claim 1, wherein a concentration of the at least one heteroatom-vacancy center is $1 \times 10^{10}/cm^3$ or greater.

* * * * *